(12) United States Patent
Matejka et al.

(10) Patent No.: US 10,739,973 B2
(45) Date of Patent: Aug. 11, 2020

(54) BANDED SLIDERS FOR OBTAINING VALUES FROM USERS

(71) Applicant: AUTODESK, INC., San Rafael, CA (US)

(72) Inventors: Justin Frank Matejka, Newmarket (CA); Michael Glueck, Toronto (CA); Tovi Grossman, Toronto (CA); George Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 152 days.

(21) Appl. No.: 15/277,951

(22) Filed: Sep. 27, 2016

(65) Prior Publication Data

US 2018/0088790 A1    Mar. 29, 2018

(51) Int. Cl.
*G06F 3/0484* (2013.01)

(52) U.S. Cl.
CPC ...... *G06F 3/04847* (2013.01); *G06F 3/04842* (2013.01)

(58) Field of Classification Search
CPC .................. G06F 3/04847; G06F 3/04842
See application file for complete search history.

(56) References Cited

U.S. PATENT DOCUMENTS

| | | | | |
|---|---|---|---|---|
| 8,887,086 B2* | 11/2014 | Bos | ............... | G06F 3/0485 345/156 |
| 9,170,721 B2* | 10/2015 | Kim | ............... | G06F 3/04855 |
| 9,891,737 B2* | 2/2018 | Homma | ............... | G06F 3/04847 |
| 2002/0186252 A1* | 12/2002 | Himmel | ............... | G06F 3/04855 715/787 |
| 2006/0022956 A1* | 2/2006 | Lengeling | ............... | G06F 3/04847 345/173 |
| 2008/0297536 A1* | 12/2008 | Matsuno | ............... | G06F 3/0485 345/684 |
| 2013/0010170 A1* | 1/2013 | Matsuzawa | ............... | G06F 3/041 348/333.01 |
| 2017/0142491 A1* | 5/2017 | Werth | ............... | G06F 3/0482 |

* cited by examiner

*Primary Examiner* — William L Bashore
*Assistant Examiner* — Gregory A Distefano
(74) *Attorney, Agent, or Firm* — Artegis Law Group, LLP

(57) ABSTRACT

In one embodiment, a banded slider application obtains values from users via a banded slider. In operation, the banded slider application generates a banded slider that includes multiple sections. Notably, the interior of a section included in the banded slider is visually distinguishable from an interior of another section that is adjacent to the section. Subsequently, the banded slider application performs operation(s) to display the banded slider and, in response, receives a user selection of a location along the banded slider. The banded slider application then computes a specified value based on the location. Advantageously, empirical evidence shows that the banded slider enables precise and/or repeatable specification of values without inducing bias associated with an inherent propensity for users to select locations that are at or near the decorations (e.g., tick marks) along conventional sliders.

21 Claims, 5 Drawing Sheets

BANDED SLIDERS FOR OBTAINING VALUES FROM USERS

BACKGROUND OF THE INVENTION

Field of the Invention

Embodiments of the present invention relate generally to computer processing and, more specifically, to banded sliders for obtaining values from users.

Description of the Related Art

Sliders are input mechanisms that allow users to specify a value within a predefined range. Sliders are commonly used for collecting responses from users in many systems across many fields. For example, a type of slider known as a Visual Analogue Scale (VAS) is often implemented in web-based research systems to obtain subjective responses in the fields of psychology, human-computer interaction, medicine, and sociology, to name a few. In another example, sliders are included in user interfaces for data collection in online survey systems and crowd-sourcing systems to rapidly recruit and collect subjective and/or objective responses to survey questions.

Some "basic" sliders include only a line with the two extreme values labeled and no additional information. One limitation of basic sliders is that they typically do not enable precise and repeatable specification of values. For example, if a user wishes to specify 32 on a line that ranges from 0 to 100, then the user may try to identify a location on the line based on the relative distance between the two extreme values and subsequently select the identified location. As is commonly experienced, the identified location oftentimes does not match the intended value and can, in fact, vary within a relatively wide range of values. For instance, the user may intend to specify 32, but the user may actually select a location that actually corresponds to 41 or 28. Further, if the user attempts to specify 32 at a later time, then the new location along the line selected by the user oftentimes does not match the location selected by the user when previously attempting to specify 32.

To enable users to specify values with precision and/or repeatability, many "enhanced" sliders include additional decorations that provide information about gradations along the line. These additional decorations may include labels, tick marks, and the like. However, although largely unrecognized, a limitation of enhanced sliders is that the additional decorations often induce undesirable bias in selecting locations along the line. More specifically, empirical evidence shows that the distribution of values specified via an enhanced slider typically illustrates as "spikes" around the decorations. Thus, there is an inherent propensity for users to select locations along the line that are at or near the decorations.

For instance, in one study, researchers generated an enhanced slider that included five equally spaced tick marks at 0, 150, 300, 450, and 600 along a line, where 0 represented white and 600 represented black. The researchers then instructed users to attempt to select locations along the line to "rate the blackness" of 50 shades of gray, spread at perceptually equal distances between white (0) and black (600). Finally, the researchers created a histogram of the selected locations. The histogram indicated that the location corresponding to the tick mark at 300 was selected approximately 5.5 times more frequently compared to the number of times that tick mark would have been selected using an unbiased (i.e., uniform) distribution of selected locations.

As the foregoing illustrates, what is needed in the art are more effective approaches for obtaining values from users via sliders.

SUMMARY OF THE INVENTION

One embodiment of the present invention sets forth a computer-implemented method for obtaining values from users. The method includes generating a banded slider that includes multiple sections, where a first section included in the sections is adjacent to a second section included in the sections, and a first set of one or more visual attributes that characterizes an interior of the first section is visually distinguishable from a second set of one or more visual attributes that characterizes an interior of the second section; performing one or more operations to display the banded slider on a display device; receiving a user selection that includes a selected location along the banded slider; and computing a specified value based on the selected location.

One advantage of the disclosed techniques is that the banded slider enables users to specify values with the precision and/or repeatability desirable for many applications without inducing significant bias in selecting locations along the banded slider. Notably, visual variations between the interiors of adjacent sections in the banded slider enable precision and/or repeatability without inducing undesirable bias. By contrast, decorations that enable precision and/or repeatability in conventional enhanced sliders often induce undesirable bias in selecting locations along the conventional enhanced slider.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
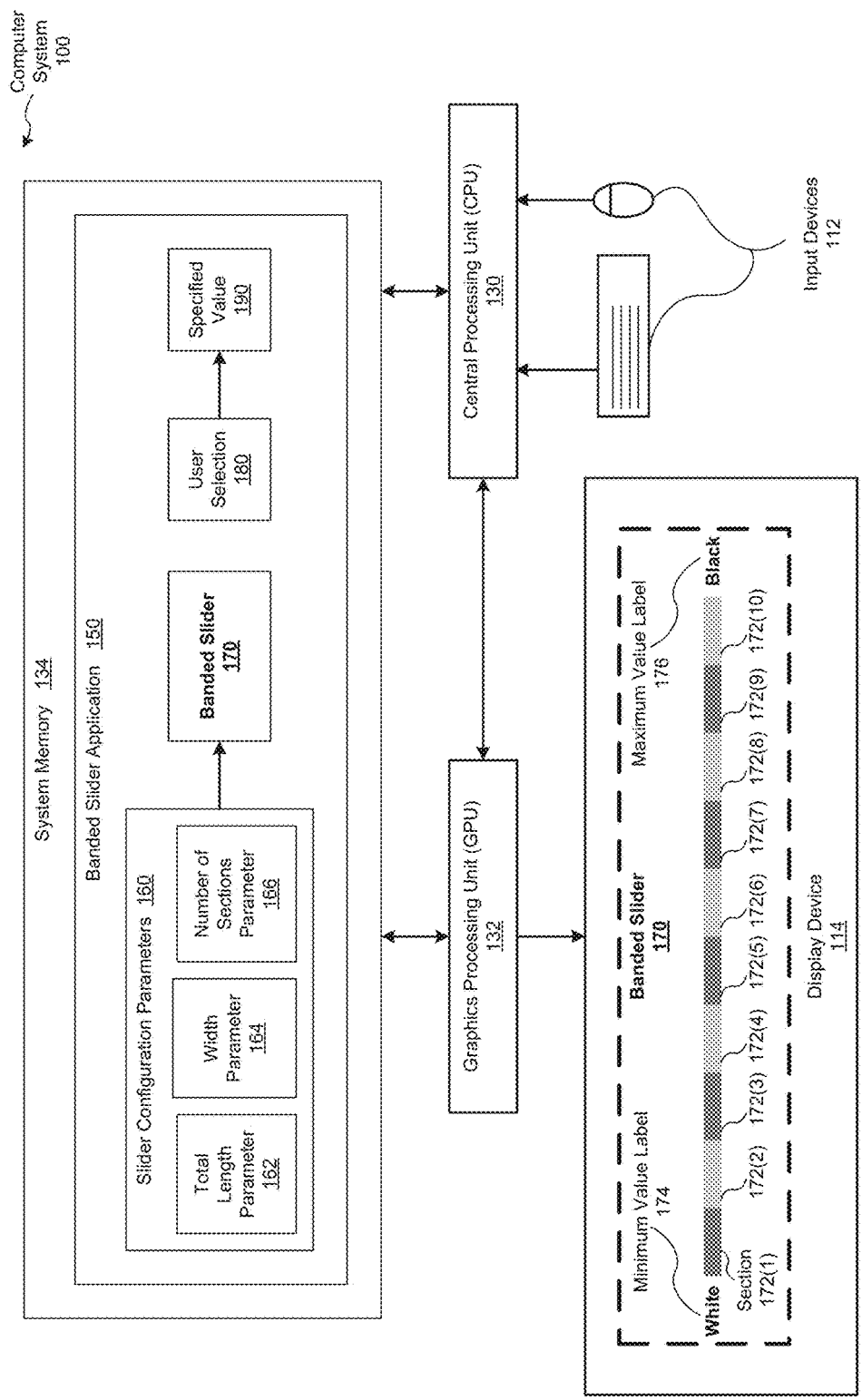
FIG. 1 is a conceptual illustration of a computer system configured to implement one or more aspects of the present invention.

FIG. 1 is a conceptual illustration of a computer system 100 configured to implement one or more aspects of the present invention. As shown, the computer system 100 includes, without limitation, a central processing unit (CPU) 130, input devices 112, a graphics processing unit (GPU) 132, a display device 114, and a system memory 134. For explanatory purposes, multiple instances of like objects are denoted with reference numbers identifying the object and parenthetical numbers identifying the instance where needed.

The CPU 130 receives input user input from the input devices 112, such as a keyboard or a mouse. In operation, the CPU 130 is the master processor of the computer system 100, controlling and coordinating operations of other system components. In particular, the CPU 130 issues commands that control the operation of the GPU 132. The GPU 132 incorporates circuitry optimized for graphics and video processing, including, for example, video output circuitry. The GPU 132 delivers pixels to the display device 114 that may be any conventional cathode ray tube, liquid crystal display, light-emitting diode display, or the like.

In various embodiments, GPU 132 may be integrated with one or more of other elements of FIG. 1 to form a single system. For example, the GPU 132 may be integrated with the CPU 130 and other connection circuitry on a single chip to form a system on chip (SoC). In alternate embodiments, the CPU 130 and/or the GPU 132 may be replaced with any number of processors. Each of the processors may be any instruction execution system, apparatus, or device capable of executing instructions. For example, a processor could comprise a digital signal processor (DSP), a controller, a microcontroller, a state machine, or any combination thereof.

The system memory 134 stores content, such as software applications and data, for use by the CPU 130 and the GPU 132. The system memory 134 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 134. The storage may include any number and type of external memories that are accessible to the CPU 130 and/or the GPU 132. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the computer system 100 shown herein is illustrative and that variations and modifications are possible. The number of CPUs 130, the number of GPUs 132, the number of system memories 134, and the number of applications included in the system memory 134 may be modified as desired. Further, the connection topology between the various units in FIG. 1 may be modified as desired. In some embodiments, any combination of the CPU 130, the GPU 132, and the system memory 134 may be replaced with any type of distributed computer system or cloud computing environment, such as a public or a hybrid cloud.

Many applications that execute on the CPU 130 and/or the GPU 132 provide sliders. For example, in some embodiments, an online survey application may implement one or more sliders to rapidly recruit and collect subjective and/or objective responses to survey questions. For explanatory purposes, as referred to herein, a slider is any device that allow users to specify a value within a predefined range based on a location along the slider. In operation, a user typically indicates a location along the slider via a slider thumb. The slider thumb may be implemented in any technically feasible fashion. For example, the slider thumb may comprise a smaller rectangle, a circle, a cross, or any other type of label or mark. Further, the slider thumb may be manipulated using any technically feasible input techniques. For example, the slider thumb may be manipulated using a mouse or via hand gestures on a handheld device.

Some "basic" sliders consists of a line with the two extreme values labeled and no additional information. However, as is commonly recognized, one limitation of basic sliders is that they do not typically enable precise and repeatable specification of values. To enable users to specify values with precision and/or repeatability, many "enhanced" sliders include additional decorations that provide information about locations along a line. Additional decorations may be any visual attributes including labels, tick marks, and the like. However, although largely unrecognized, a limitation of enhanced sliders is that the additional decorations often induce undesirable bias in selecting locations along the enhanced slider. More specifically, the distribution of values specified via an enhanced slider typically illustrates "spikes" around the decorations that demonstrate a propensity of users to select locations along the enhanced slider that are at or near the decorations.

Banded Slider

To enable users to precisely and/or repeatably specify values without inducing undesirable bias associated with selecting locations along lines that include multiple decorations, the system 100 implements techniques that provide a banded slider 170. The banded slider 170 includes, without limitation, a minimum value label 174, a maximum value label 176, and any number of sections 172. The minimum value label 174 is a static label that denotes the minimum value associated with the banded slider 170. The maximum value label 176 is a static label that denotes the maximum value associated with the banded slider 170. In alternate embodiments, the banded slider 170 may not include the minimum value label 174 and/or the maximum value label 176.

The sections 172 are arranged in a non-overlapping, contiguous fashion to extend from a location corresponding to a minimum value associated with the banded slider 170 to a location corresponding to a maximum value associated with the banded slider 170. As a general matter, each of the sections 172 may be any shape that has at least two dimensions. Notably, the banded slider 170 does not include decorations to indicate locations along the banded slider 170. Instead, an interior of each of the sections 172 is characterized by a set of any number and combination of visual attributes, and visual differences between the interiors of adjacent sections 172 indicate locations along the banded slider 170.

Each set of any number and combination of visual attributes is also referred to herein as a "fill." Visual attributes may include any number of visual properties (e.g., colors, shapes, patterns, textures, etc.) and/or visual effects (e.g., gradients, shadowing, reflections, etc.), in any combination. A gradient is a gradually progression of colors, shades, textures, etc. within the interior of a shape. As referred to herein, if an interior of the section 172 is characterized by a particular fill, then the section 172 is also characterized by the fill.

For explanatory purposes, the banded slider 170 depicted in FIG. 1 includes the ten sections 172(1) through 172(10), the minimum value label 174 "white," and the maximum value label 176 "black." The ten sections 172(1) through 172(10) are arranged in a non-overlapping, contiguous fashion to extend horizontally from a location at 0 pixels to a location at 600 pixels. Further, each of the sections 172 is distinguished from any adjacent sections 172 based on the fills of the sections 172. More specifically, as shown, the sections 172(1), 172(3), 172(5), 172(7), and 172(9) are characterized with a dark shade of gray. By contrast, the sections 172(2), 172(4), 172(6), 172(8), and 172(10) are characterized by a light gray fill. Accordingly, the banded slider 170 presents a visual pattern that alternates between a dark shade of gray and a light shade of gray along the length of the banded slider 170.

Empirical evidence shows that the banded slider 170 that includes the ten sections 172 enables specification of values with similar levels of precision and repeatability to a prior art slider that includes eleven tick marks (including tick marks at the extreme values). Further, empirical evidence shows that the distribution of values specified via the banded slider 170 does not illustrate an inherent propensity for users to select any particular locations along the banded slider 170 (with the exception of the maximum and minimum values).

In alternate embodiments, the banded slider 170 may include any number of the sections 172. Each of the sections 172 may be characterized by any fill that visually distinguishes the section 172 from any of the other sections 172 that are adjacent to the section 172. Further, in various embodiments, the banded slider 170 may include any number (including zero) of other static or dynamic feedback mechanisms. For example, in some embodiments, the banded slider 170 includes a slider thumb (not shown in FIG. 1) that denotes a current location along the banded slider 170. The slider thumb may be any type of label, such as a cross, a circle, etc.

As shown, the system 100 includes, without limitation, a banded slider application 150 that generates the banded slider 170. The banded slider application 150 comprises a software program that generally resides with the system memory 134 and is executed by the CPU 130. The banded slider application 150 is configured to generate the banded slider 170, perform operation(s) to display the banded slider 170 on the display device 114, and receive user input from the input devices 112.

For explanatory purposes, "operation(s) to display" may include any number of operations that directly or indirectly configure any number and type of the display devices 114. For example and in some embodiments, the banded slider application 150 configures a cloud-based survey application to display the banded slider 170 on the display device 114. More specifically, the banded slider application 150 transmits display information associated with the banded slider 170 to the survey application. The survey application then configures the display device 114 included in a handheld consumer device to display the banded slider 170 based on the display information.

As referred to herein, "user input" refers to any information that is received by the banded slider application 150 based on any direct or indirect user action(s). As a general matter, the banded slider application 150 may receive user input from any of the input devices 112 or associated applications. For example, in some embodiments, the banded slider application 150 may receive user input based on one or more gestures that the user performs to manipulate a slider thumb. The banded slider application 150 may receive the user input from any entity in any technically feasible fashion.

In alternate embodiments, the banded slider application 150 may perform operation(s) to prompt the user to enter user input. After the banded slider application 150 processes the user input, the banded slider application 150 may configure the display device 114 to redisplay the banded slider 170. In some alternate embodiments, the banded slider application 150 may perform operation(s) to display a current location along the banded slider 170 with a value label and/or a slider thumb.

In operation, the banded slider application 150 generates the banded slider 170 based on slider configuration parameters 160. As shown, the slider configuration parameters 160 include, without limitation, a total length parameter 162, a width parameter 164, and a number of sections parameter 166. The total length parameter 162 specifies a distance in a first dimension along which the user may select locations. The width parameter 164 specifies a distance in a second dimension that, together with the total length parameter 162, defines the extent of the banded slider 170 in two dimensions. The number of sections parameter 166 specifies the number of the sections 122 included in the banded slider 170. For example, suppose that the slider configuration parameters 160 were to specify the total length parameter 162 as 600 pixels, the width parameter 164 as 5 pixels, and the number of sections parameter 166 as 10. In some embodiments, the banded slider application 150 would generate a 600 pixel by 5 pixel banded slider 170 that includes ten 60 pixel by 5 pixel contiguous rectangular segments 122.

In alternate embodiments, the slider configuration parameters 160 may include any number and type of parameters. For example, in some embodiments, the slider configuration parameters 160 may include a total number and/or type of fills. In alternate embodiments, the slider configuration parameters 160 may include the total length parameter 162, but neither the width parameter 164 nor the number of sections parameter 166. In such embodiments the banded slider application 150 may set the width to a predetermined width, and compute the number of sections 122 based on the total length parameter 162 and a predetermined section length.

In some alternate embodiments, the banded slider application 150 may receive the slider configuration parameters 160 in any technically feasible fashion. For example, the banded slider application 150 could receive the slider configuration parameters 160 via a graphical user interface application. In other alternate embodiments, the banded slider application 150 may not include the slider configuration parameters 160. In such embodiments, the banded slider application 150 may configure the banded slider 170 in any technically feasible fashion. For example, the banded slider application 150 could implement a predefined total length, a predefined width, and a predefined number of the sections 122.

The banded slider application 150 then performs operation(s) to display the banded slider 170 on the displace device 114. In response, the banded slider application 150 receives a user selection 180 that includes a selected location along on the banded slider 170. The banded slider application 150 then computes a specified value 190 based on the selected location. The banded slider application 150 may be configured to receive any number of user selections 180 and, in response, compute any number of corresponding specified values 190. Advantageously, the banded sliders 170 that enable a given precision have been empirically shown to induce substantially less bias in the user selections 180 and, consequently, the specified values 190, than prior art sliders that enable a similar level of precision via decorations.

In alternate embodiments, the banded slider application 150 may also perform operation(s) to prompt the user and/or display stimulus on the display device 114. In some alternate embodiments, the banded slider application 150 may be configured to repeatedly perform operations to prompt the user and/or display different stimulus until the user has finished entering the specified values 190. The banded slider application 150 may determine that the user has finished entering the specified values 190 in any technically feasible fashion. For example, the banded slider application 150 could determine that the user has finished entering the specified values 190 after a predetermined inactivity time.

In alternate embodiments, the system memory 134 may not include the banded slider application 150. In other embodiments, the banded slider application 150 are integrated into any number (including one) of software applications. In some embodiments, the banded slider application 150 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, the banded slider application 150 may execute on distributed systems communicating over computer networks including local area networks or large, wide area networks, such as the Internet. Notably, the banded slider application 150 described herein is not limited to any particular computing system and may be adapted to take advantage of new computing systems as they become available.

Note that the techniques described herein are illustrative rather than restrictive, and may be altered without departing from the broader spirit and scope of the invention. Many modifications and variations on the functionality provided by the banded slider application 150 and/or the banded slider 170 will be apparent to those of ordinary skill in the art without departing from the scope and spirit of the described embodiments. For example, in various embodiments, any number of the techniques may be implemented while other techniques may be omitted in any technically feasible fashion that provides a banded slider 170 that includes multiple sections 122 with visually distinct interiors.

Further, the banded slider application 150 and/or the banded slider 170 may be implemented in any technically feasible fashion. In some embodiments, the banded slider application 150 may be a stand-alone application. For example, the banded slider application 150 could be a Javascript that is embedded in a webpage that is compatible with a browser that executes on a smartphone. In some embodiments, the banded slider application 150 may be included as part of a cloud-based online survey tool. In alternate embodiments, the system 100 may include the banded slider 170 but not the banded slider application 150. In such embodiments, the system 100 may not include the CPU 130, the GPU 132, the system memory 134, and/or the display device 114. As a general matter, the banded slider 170 may be provided to users in any technically feasible fashion.

Any entity may implement the techniques described herein to implement the banded slider 170 in software, hardware, or any combination thereof. For example, in some embodiments, a software embodiment of the banded slider 170 may be included in a user interface widget. By contrast, a physical embodiment of the banded slider 170 may include any number and combination of mechanical components, electrical components, optical components, and so forth, in any technically feasible fashion. For example, in some embodiments a console (e.g., a mixing board) may include a physical banded slider 170. In various embodiments, the physical banded slider 170 may include a vertically-oriented mechanical slider scale partitioned into multiple visually distinct physical sections 122, and a mechanical slider thumb that is adjustable to select different locations along the slider scale.

Figure 2A:
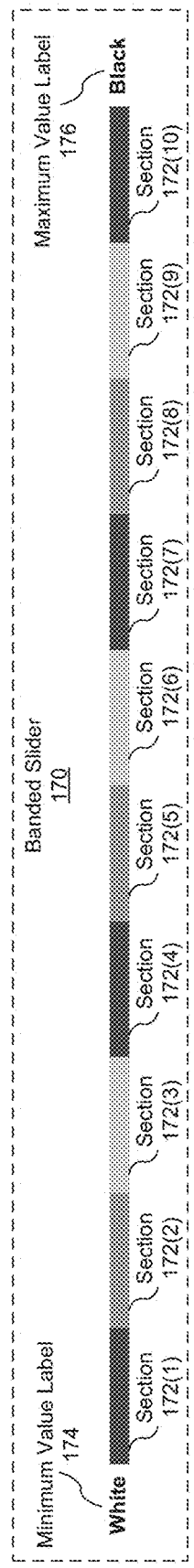
FIG. 2A illustrates an example of an alternate layout for the banded slider of FIG. 1, according to various embodiments of the present invention.

FIG. 2A illustrates an example of an alternate layout for the banded slider 170 of FIG. 1, according to various embodiments of the present invention. As shown, the alternate layout of the banded slider 170 is characterized by three shades of gray. More specifically, as shown, the sections 172(1), 172(4), 172(7), and 172(10) are characterized by a dark shade of gray. The sections 172(2), 172(5), and 172(8) are characterized by a medium shade of gray. The sections 172(3), 172(6), and 172(9) are characterized by a light shade of gray. Accordingly, the alternate layout of the banded slider 170 presents a visual pattern that repeatedly changes from a dark shade of gray to a medium shade of gray gray and then to light shade of gray along the length of the banded slider 170.

Figure 2B:
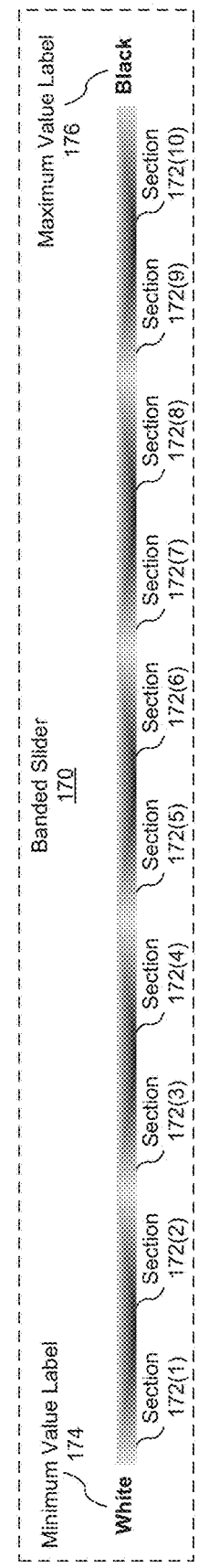
FIG. 2B illustrates another example of an alternate layout for the banded slider of FIG. 1, according to various embodiments of the present invention.

FIG. 2B illustrates another example of an alternate layout for the banded slider 170 of FIG. 1, according to various embodiments of the present invention. As shown, the alternate layout of the banded slider 170 is characterized by gradients. More specifically, as shown, the sections 172(1), 172(3), 172(5), 172(7), and 172(9) are characterized by a gradient that starts at a light shade of gray and gradually transitions to a dark shade of gray. By contrast, the sections 172(2), 172(4), 172(6), 172(8), and 172(10) are by a gradient that starts at a dark shade of gray and gradually transitions to a light shade of gray. Accordingly, the alternate layout of the banded slider 170 presents a repeated visual pattern that gradually undulates between a light shade of gray and a dark shade of gray, and the interfaces between the sections 172(1) through 172(10) are blurred.

Figure 3A:
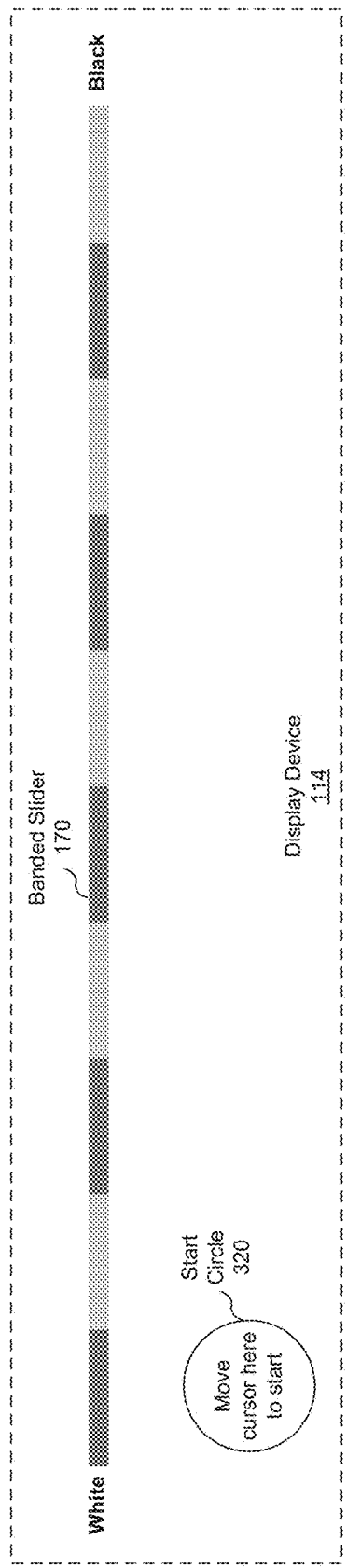
FIGS. 3A and 3B illustrate examples of the banded slider of FIG. 1 at two different times during a prompting process, according to various embodiments of the present invention.
Figure 3B:
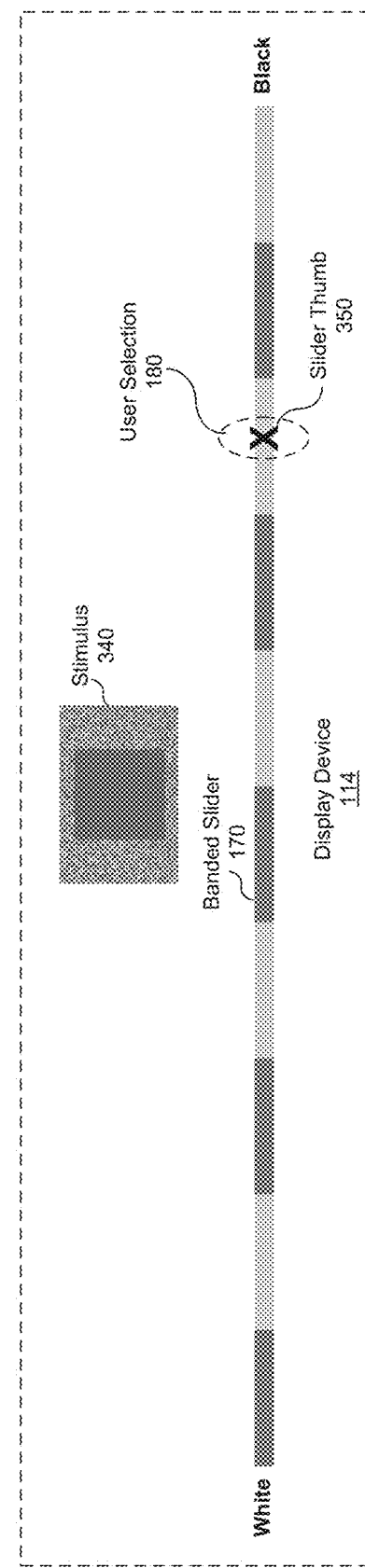

FIGS. 3A and 3B illustrate examples of the banded slider 170 of FIG. 1 at two different times during a prompting process, according to various embodiments of the present invention. In operation, the banded slider application 150 implements a two-step prompting process that encourages a user to enter the specified value 190. In alternate embodiments, the banded slider application 150 may implement any prompting process (including none) instead of the two-step prompting process described herein. For example, in some embodiments, the banded slider application 150 performs operation(s) to display the banded slider 170 in a stand-alone manner.

As shown in FIG. 3A, during a first step in the prompting process, the banded slider application 150 performs operation(s) to display the banded slider 170 and a start circle 320 on the display device 114. In alternate embodiments, the banded slider application 150 may display any object instead of the start circle 320. As shown, the start circle 320 includes the label "move cursor here to start." The banded slider application 150 generates and positions the start circle 320 to minimize any bias associated with any previous user selections 180. For example, the banded slider application 150 may position the start circle 320 below the banded slider 170. Such a positioning discourages the user from passively selecting an unchanged location along the banded slider 170 for multiple users selections 180.

In alternate embodiments, to further reduce any bias associated with the prompting process, the banded slider application 150 may vary the location of the start circle 320. For example, to prompt for a first specified value 190, the banded slider application 150 could position the start circle 320 under the left half of the banded slider 170. To prompt for a second specified value 190, the banded slider application 150 could position the start circle 320 under the right half of the banded slider 170.

In response to user input that indicates a positive response to the start circle 320, the banded slider 320 performs the second step in the prompting process. The banded slider application 150 may receive user input and determine that the user input indicates a positive response in any technically feasible fashion. For example, in some embodiments, the banded slider application 150 may receive user input via an input device (e.g., mouse). If the banded slider application 150 determines that the user input includes a start location that is within the start circle 320, then the banded slider application 150 determines that the user input indicates a positive response.

As shown in FIG. 3B, during the second step in the prompting process, the banded slider application 150 performs operation(s) to display a stimulus 340 and a slider thumb 350 instead of the start circle 320 on the display device 114. Throughout the prompting process, the banded slider application 150 continues to perform operation(s) to display the banded slider 170 on the display device 114. The stimulus 340 may be any amount (including zero) and type of data that prompts the user to select a location along the banded slider 170. After detecting user input that includes a current location that is within a predetermined distance from the banded slider 170, the banded slider application 150 performs operations to generate and display the slider thumb 350.

In general, during the second step, the banded slider application 150 continuously displays the slider thumb 350 along the banded slider 170 based on the current location included in the user input. For example, suppose that user input initially specifies that the user is hovering over a current location of 515 pixels along the banded slider 170. The banded slider application 150 would performs operation(s) to display the slider thumb 350 as a cross at a location of 515 pixels along the banded slider 170. Further, suppose that user input subsequently specifies that the user is hovering over a location of 102 pixels along the banded slider 170. The banded slider application 150 would perform operation(s) to display the slider thumb 350 at a location of 102 pixels instead of 515 pixels along the banded slider 170.

In alternate embodiments, the banded slider application 150 may generate and position the slider thumb 350 in any technically feasible fashion. For example, the slider thumb 350 could comprise a relatively small rectangle, a circle, a cross, or any other type of label or mark. Further, in various embodiments, the slider thumb 350 may be manipulated using any technically feasible input techniques. For example, the slider thumb 350 could be manipulated using a mouse or via hand gestures on a touch-sensitive display included in a handheld device.

In alternate embodiments, the banded slider application 150 may perform operation(s) to display a value text label (not shown) on the display device 114. In such embodiments, the banded slider application 150 may compute a current value based on the current location included in the user input. Subsequently, the banded slider application 150 may perform operation(s) to display a value text label that specifies the current value and, consequently, provides additional textual feedback to the user. The banded slider application 150 may compute the current value in any technically feasible fashion. For example, the banded slider application 150 could compute a current percentage based on a minimum location corresponding to the minimum value label 174, a maximum location corresponding to the maximum value label 176, and the current location along the banded slider 170. The banded slider application 150 could then multiply the current percentage and the maximum value associated with the banded slider 170 to determine the current value.

Upon receiving user input during the second step of the prompting process, the banded slider application 150 determines whether the user input is the user selection 180. The banded slider application 150 may determine whether the user input is the user selection 180 in any technically feasible fashion. For example, if the user input indicates that the user hovered above the current location, then the banded slider application 150 could determine that the user input is the user selection 180. By contrast, if the user input indicates that the user clicked on the current location, then the banded slider application 150 could determine that the user input is the user selection 180.

After receiving the user selection 180, the banded slider application 150 computes the specified value 190 based on the current location, now referred to as the selected location, included in the user selection 180. The banded slider application 150 may compute the specified value 190 in any technically feasible fashion. For example, the banded slider application 150 could compute a selected percentage based on a minimum location corresponding to the minimum value label 174, a maximum location corresponding to the maximum value label 176, and the selected location along the banded slider 170. The banded slider application 150 could then multiply the selected percentage and the maximum value associated with the banded slider 170 to determine the specified value 190. In alternate embodiments, the banded slider application 150 may display a value text label that includes the specified value 190 to provide additional textual feedback to the user.

After computing the specified value 190 in response to user input, the banded slider application 150 repeats the two-step prompting process to prompt the user for a new specified value 190 until the user has finished entering the specified values 190. More specifically, after computing the specified value 190, the banded slider application 150 performs operation(s) to display the start circle 320 instead of the stimulus 340 and the slider thumb 350 on the display device 114. Subsequently, in response to user input, the banded slider application 150 performs operation(s) to display a new stimulus 340 and the slider thumb 350 instead of the start circle 320 on the display device 114. Throughout the prompting process, the banded slider application 150 continues to perform operation(s) to display the banded slider 170 on the display device 114.

Figure 4A:
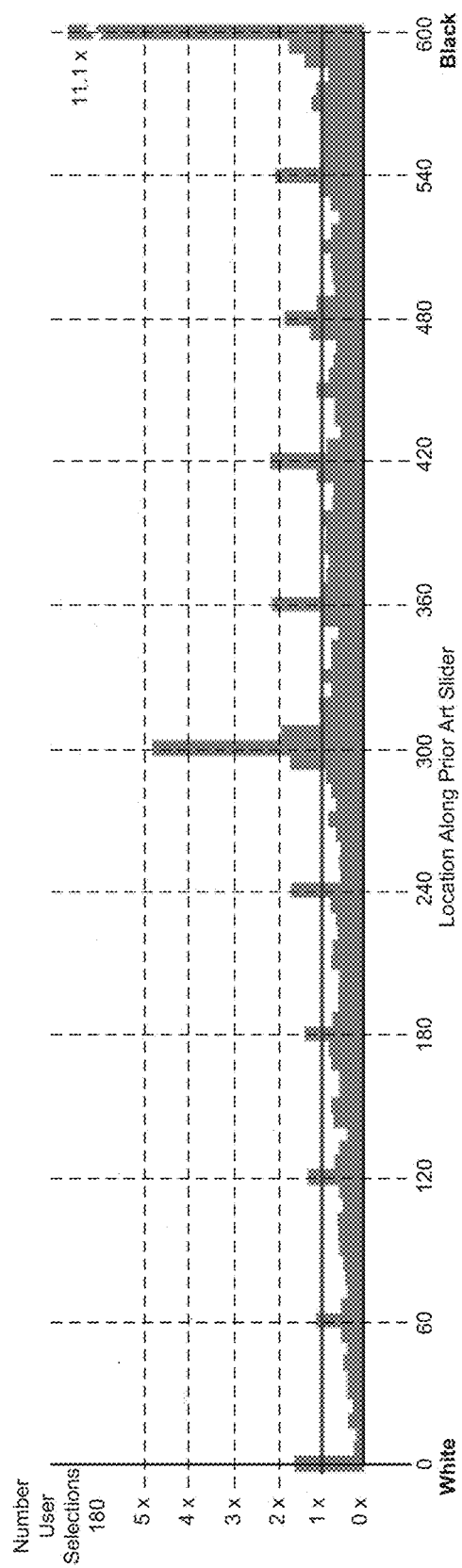
FIGS. 4A and 4B illustrate a comparison between a prior art slider and the banded slider of FIG. 1, according to various embodiments of the present invention.
Figure 4B:
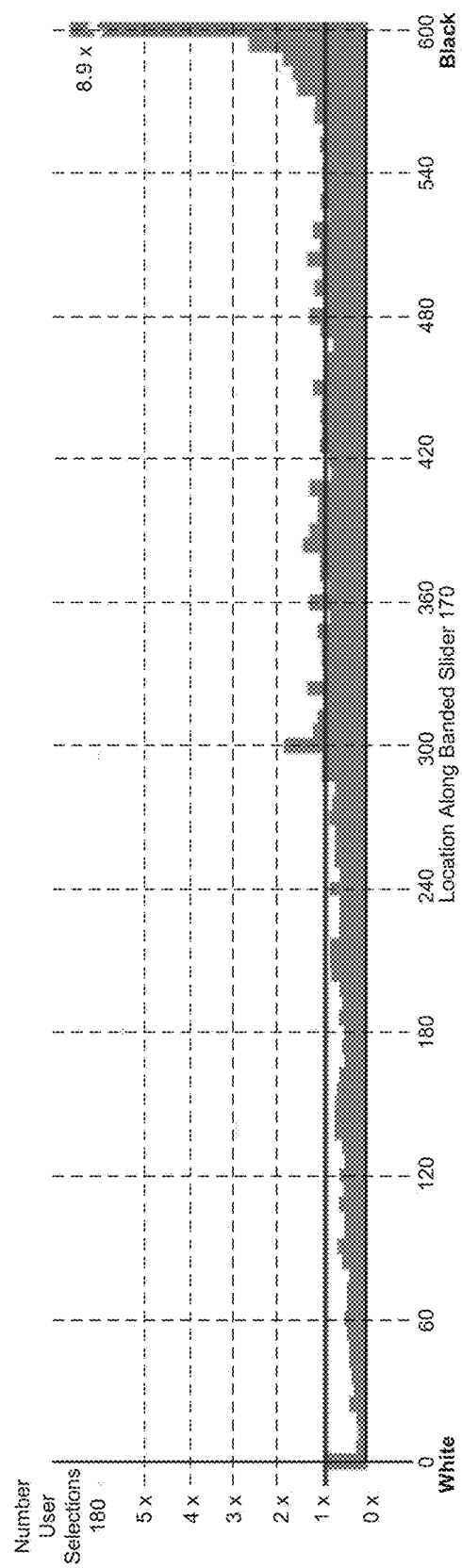

FIGS. 4A and 4B illustrate a comparison between a prior art slider and the banded slider 170 of FIG. 1, according to various embodiments of the present invention. More specifically, FIG. 4A illustrates an example of the distribution of user selections 180 obtained via a prior art slider that includes eleven tick marks equally spaced between 0 pixels and 600 pixels (inclusive). For explanatory purposes, the prior art slider that includes eleven tick marks is also referred to herein as the "prior art slider." FIG. 4B illustrates an example of the distribution of the user selections 180 obtained via the banded slider 170.

Empirically evidence shows that the precision and repeatability with which users are able to select locations along the prior art slider are similar to the precision and repeatability with which users are able to select locations along the banded slider 170. Consequently, the precision and repeatability of the specified values 190 obtained via the prior art slider are similar to the precision and repeatability of the specified values 190 obtained via the banded slider 170. Empirical evidence further shows that the time required for users to select locations along the prior art slider is comparable to the time required for users to select locations along the banded slider 170.

To obtain the user selections 180 along the prior art slider and the banded slider 170, researchers instructed users to attempt to "rate the blackness" of 50 shades of gray, spread at perceptually equal distances between white (0) and black (600). In response, the users selected locations along, respectively, the prior art slider and the banded slider 170. For each location, the researchers then normalized the number of the user selections 180 specifying the location to the expected number of selections specifying the location. Because each location corresponds to a particular specified value 190, the distribution of the selected locations reflects the distribution of the specified values 190. Accordingly, as persons skilled in the art will recognize, a distribution of unbiased specified values 190 would correspond to a uniform distribution of selected locations. More specifically, if the specified values 190 were unbiased, then for each location that corresponds to one of the shades of gray, a number of the user selections 180 would be 1.

As shown, the distribution of the user selections 180 obtained via the prior art slider illustrates significant spikes centered around each of the ticks marks. In particular, the users selected the location of 300 pixels that corresponds to the sixth tick mark along the prior art slider nearly five times more frequently compared to the number of times that the location of 300 pixels would have been selected using an unbiased (i.e., uniform) distribution of selected locations. Notably, the distribution of the user selections 180 obtained via the banded slider 170 is significantly smoother and more uniform than the distribution of the user selections 180 obtained via the prior art slider. Advantageously, the distribution of the user selections 180 obtained via the banded slider 170 does not illustrate significant propensity for users to select specific locations other than the location corresponding to the maximum value label 176.

Figure 5:
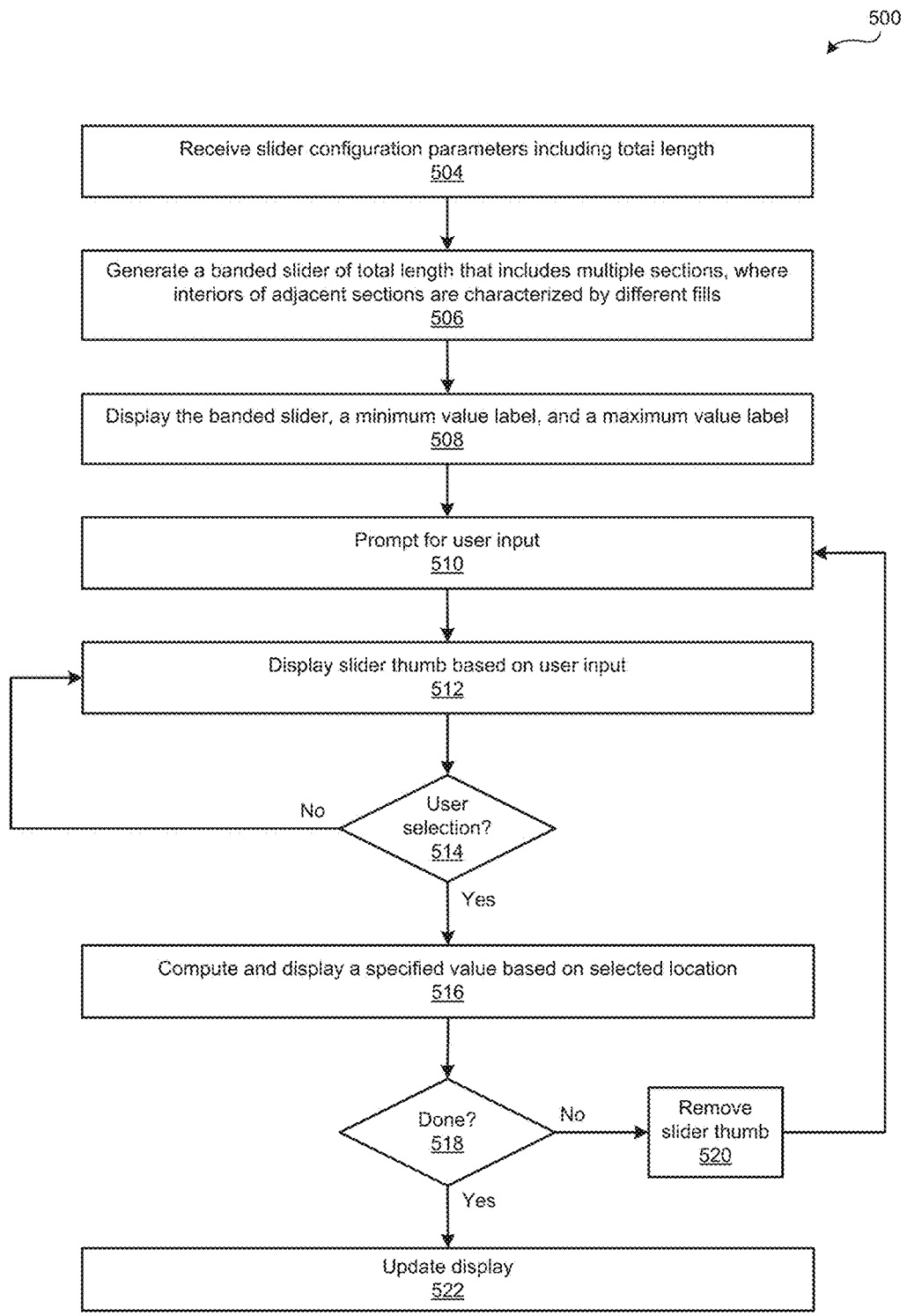
FIG. 5 is a flow diagram of method steps for obtaining values from users via a banded slider, according to various embodiments of the present invention.

FIG. 5 is a flow diagram of method steps for obtaining values from users via a banded slider, according to various embodiments of the present invention. Although the method steps are described with reference to the systems of FIGS. 1-3, persons skilled in the art will understand that any system configured to implement the method steps, in any order, falls within the scope of the present invention.

As shown, a method 500 begins at step 504, where the banded slider application 150 receives the slider configuration parameters 160. The slider configuration parameters 160 may include any number and type of parameters that customize the banded slider 170. For example, in some embodiments, the slider configuration parameters 160 include the total length parameter 162, the width parameter 164, and the number of sections parameter 166. In alternate embodiments, the banded slider application 150 may not receive the slider configuration parameters 160, and the banded slider application 150 may configure the banded slider 170 based on any information. For example, the banded slider application 150 could include predetermined values for the total length, the width, and the number of sections.

At step 506, the banded slider application 150 generates the banded slider 170 that includes multiple sections 172 based on the slider configuration parameters 160, where the interiors of adjacent sections 172 are characterized by different fills. More specifically, the banded slider application 150 generates the banded slider 170 that include a total number of the sections 172 that is equal to the number of sections parameter 166. The sections 172 are contiguous and non-overlapping and each of the sections 172 has one dimension equal to the width parameter 164. The sum of a second dimension of the sections 172 equals the total length parameter 162. The sections 172 may be any technically feasible shape. For example, in some embodiments the sections 172 are rectangles of the same size.

For each of the sections 172, the banded application 170 ensures that an interior of the section 172 is characterized by a fill that visually differentiates the section 172 from any other sections 172 that are adjacent to the section 172. For example, the interior of the section 172(1) could be characterized by a light shade of gray, the interior of the section 172(2) could be characterized by a dark shade of gray, the interior of the section 172(3) could be characterized by the light shade of gray, and so forth. In alternate embodiments, the banded slider application 150 may generate any layout for the banded slider 170 that is consistent with differentiating adjacent sections 172 based on any number of visual attributes that characterize the interiors of the sections 172. Visual attributes may include any number of colors, shapes, patterns, textures, gradients, shadows, reflections, and the like, in any combination.

At step 508, the banded slider application 150 performs operation(s) to display the banded slider 170, the minimum value label 174, and the maximum value label 176. The operation(s) may directly or indirectly cause any number and type of the display devices 114 to display the banded slider 170, the minimum value label 174, and the maximum value label 176 in any technically feasible fashion. For example, the banded slider application 150 could transmit the banded slider 170, the minimum value label 174, and the maximum value label 176 to a user interface application. The user interface application could then configure the display device 114 to display the banded slider 170, the minimum value label 174, and the maximum value label 176.

At step 510, the banded slider application 150 prompts for user input. The banded slider application 150 may prompt for user input in any technically feasible fashion. For example, the banded slider application 150 could perform operation(s) to display the start circle 320. Upon receiving user input that includes a location that is within the start circle 320, the banded slider application 150 could then perform operation(s) to display the stimulus 340. In alternate embodiments, the banded slider application 150 may not prompt for user input, and the method 500 may not include the step 510.

At step 512, the banded slider application 150 performs operation(s) to display the slider thumb 350 based on user input that includes a current location. More specifically, the banded slider application 150 causes the display device 114 to visually display the slider thumb 350 at the current location along the banded slider 170. At part of step 512, the banded slider application 150 determines whether the user input is the user selection 180. The banded slider application 150 may determine whether the user input is the user selection 180 in any technically feasible fashion. For example, if the user input indicates that the user hovered above the current location, then the banded slider application 150 could determine that the user input is not the user selection 180. By contrast, if the user input indicates that the user clicked on the current location, then the banded slider application 150 could determine that the user input is the user selection 180.

If, at step 514, the banded slider application 150 determines that the user input is not the user selection 180, then the method 500 returns to step 512, where the banded slider 150 receives new user input. The banded slider application 150 continues to cycle through steps 512-514, processing new user input and updating the slider thumb 350 until the banded slider 150 determines that the new user input is the user selection 180. Notably, the slider thumb 350 provides visual feedback that enables the user to effectively interact with the banded slider 170.

In alternate embodiments, as part of step 514, the banded slider application 150 may compute a current value based on the current location. Subsequently, in such embodiments, the banded slider application 150 may perform operation(s) to display a value text label. The value text label specifies the current value and, consequently, provides additional textual feedback to the user. The banded slider application 150 may compute the current value in any technically feasible fashion. For example, the banded slider application 150 could compute a current percentage based on a minimum location corresponding to the minimum value label 174, a maximum location corresponding to the maximum value label 176, and the current location along the banded slider 170. The banded slider application 150 could then multiply the current percentage and the maximum value associated with the banded slider 170 to determine the current value.

If, however, at step 514, the banded slider application 150 determines that the user input is the user selection 180, then the method 500 proceeds to step 516. At step 516, the banded slider application 150 computes the specified value 190 based on the current location, now referred to as the selected location, included in the user selection 180. The banded slider application 150 may compute the specified value 190 in any technically feasible fashion. For example, the banded slider application 150 could compute a selected percentage based on a minimum location corresponding to the minimum value label 174, a maximum location corresponding to the maximum value label 176, and the selected location along the banded slider 170. The banded slider application 150 could then multiply the selected percentage and the maximum value associated with the banded slider 170 to determine the specified value 190.

At step 518, the banded slider application 150 determines whether the user has finished entering the specified values 190 via the banded slider 170. If, at step 518, the banded slider application 150 determines that the user has not finished entering the specified values 190, then the method 500 proceeds to step 520. At step 520, the banded slider application 150 performs operation(s) that remove the slider thumb 350 from the banded slider 170 displayed on the display device 114. The method 500 then returns to step 510, where the banded slider application 150 prompts for new user input. The banded slider application 150 continues to cycle through steps 510-520, processing new user input until the banded slider 150 determines that the user has finished entering the specified values 190 via the banded slider 170. In alternate embodiments, the banded slider application 150 may not include step 520, step 510, or both steps 520 and 510, and the method 500 is modified accordingly.

If, however, at step 518, the banded slider application 150 determines that the user has finished entering the specified values 190 via the banded slider 170, then the method 500 proceeds directly to step 522. At step 522, the banded slider application 150 performs operation(s) to cease displaying the banded slider 170, the minimum value label 174, the maximum value label 176, and the slider thumb 350. In alternate embodiments, the banded slider application 150 may update the display device 114 in any technically feasible fashion to indicate that the banded slider 170 is no longer accepting user input. The method 500 then terminates.

In sum, the disclosed techniques may be used to obtain values from users via a banded slider. In some embodiments, a banded slider application generates a banded slider that includes multiple contiguous, non-overlapping sections, where an interior of each section is characterized by a fill that visually differentiate the interior of the section from the interiors of any adjacent section(s). The banded slider application then performs operation(s) to display the banded slider annotated with a minimum value label and a maximum value label, and prompts the user to select a location along the banded slider. As the user interacts with the banded slider, the banded slider application updates a slider thumb that indicates a current location. When the user selects the current location, the banded slider application computes a specified value based on the current location.

Advantageously, the disclosed techniques enable users to specify precise and/or repeatable values via a banded slider that does not include additional decorations that often induce undesirable bias in selecting locations along conventional enhanced sliders. In particular, visual variations between the interiors of sections included the banded slider enable the precision and/or repeatability desirable for many applications without inducing significant bias in selecting locations along the banded slider. By contrast, empirical evidence shows that the distribution of values specified via an enhanced slider typically illustrates an inherent propensity for users to select locations along the enhanced slider that are at or near the decorations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for obtaining values from users, the method comprising:
    generating a banded slider that includes a plurality of sections, wherein a first section included in the plurality of sections is adjacent to a second section included in the plurality of sections, and a first set of one or more visual attributes that characterizes an interior of the first section is visually distinguishable from a second set of one or more visual attributes that characterizes an interior of the second section, wherein each of the first section and the second section comprises a plurality of selectable locations representing a plurality of different values, and the first section and the second section have dimensions that are the same for representing a same number of different values; and
    performing one or more operations to display the banded slider on a display device;
    receiving an initial input that indicates a temporary location along the banded slider;
    in response to receiving the initial input, displaying a slider thumb along the banded slider on the display device, wherein the slider thumb comprises a user-adjustable slider that is moveable along the banded slider;
    receiving, via the slider thumb, a user selection that includes a selected location along the banded slider; and
    computing a specified value based on the selected location.

2. The computer-implemented method of claim 1, wherein the one or more visual attributes include at least one of a color, shape, pattern, and texture.

3. The computer-implemented method of claim 1, wherein the one or more visual attributes include at least one of a gradient, shadow, and reflection.

4. The computer-implemented method of claim 1, further comprising performing one or more operations to display a minimum value and a maximum value on the display device.

5. The computer-implemented method of claim 1, further comprising prompting for the user selection.

6. The computer-implemented method of claim 5, wherein prompting for the user selection comprises:
    performing one or more operations to display a starting shape on the display device;
    receiving a first user input that includes a start location within the starting shape; and
    in response to receiving the first user input, performing one or more operations to display a stimulus instead of the starting shape on the display device.

7. The computer-implemented method of claim 1, further comprising performing one or more operations to display the specified value on the display device.

8. The computer-implemented method of claim 1, wherein the plurality of sections of the banded slider does not include any labels.

9. The computer-implemented method of claim 1, wherein the plurality of sections of the banded slider does not include any decorations.

10. The computer-implemented method of claim 1, wherein:
    the banded slider further includes a minimum value label located at a first end of the plurality of sections and a maximum value label located at a second end of the plurality of sections, and
    the banded slider does not include any labels between the minimum value label and the maximum value label.

11. The computer-implemented method of claim 1, wherein the slider thumb is not displayed along the banded slider before receiving the initial input that indicates a temporary location along the banded slider.

12. The computer-implemented method of claim 1, wherein the slider thumb is displayed at the temporary location along the banded slider on the display device.

13. One or more non-transitory computer-readable media including instructions that, when executed by a processing unit, cause the processing unit to obtain values from user, by performing the steps of:
generating a banded slider that includes a plurality of sections, wherein a first section included in the plurality of sections is adjacent to a second section included in the plurality of sections, and a first set of one or more visual attributes that characterizes an interior of the first section is visually distinguishable from a second set of one or more visual attributes that characterizes an interior of the second section, wherein the first section and second section each comprises a plurality of selectable locations representing a plurality of different values, and the first section and the second section have dimensions that are the same for representing a same number of different values; and
performing one or more operations to display the banded slider on a display device;
receiving an initial input that indicates a temporary location along the banded slider;
in response to receiving the initial input, displaying a slider thumb along the banded slider on the display device, wherein the slider thumb comprises a user-adjustable slider that is moveable along the banded slider;
receiving, via the slider thumb, a user selection that includes a selected location along the banded slider; and
computing a specified value based on the selected location.

14. The one or more non-transitory computer-readable media of claim 13, wherein the one or more visual attributes include at least one of a color, shape, pattern, and texture.

15. The one or more non-transitory computer-readable media of claim 13, wherein the one or more visual attributes include at least one of a gradient, shadow, and reflection.

16. The one or more non-transitory computer-readable media of claim 13, further comprising computing a temporary value based on the temporary location and performing one or more operations to display the temporary value on the display device.

17. A system, comprising:
a memory storing instructions;
a processor coupled to the memory, wherein upon executing the instructions, generates a graphical user interface for display comprising:
a banded slider comprising a plurality of sections, wherein a first section included in the plurality of sections is adjacent to a second section included in the plurality of sections, and a first set of one or more visual attributes that characterizes an interior of the first section is visually distinguishable from a second set of one or more visual attributes that characterizes an interior of the second section, wherein the first section and second section each comprises a plurality of selectable locations representing a plurality of different values, and the first section and the second section have dimensions that are the same for representing a same number of different values; and
a slider thumb, comprising a user-adjustable slider that is moveable along the banded slider, wherein the slider thumb is displayed in the graphical user interface in response to receiving an initial input indicating a temporary location along the banded slider, the slider thumb being displayed along the banded slider in the graphical user interface.

18. The system of claim 17, wherein the one or more visual attributes include at least one of a color, shape, pattern, and texture.

19. The system of claim 17, wherein the one or more visual attributes include at least one of a gradient, shadow, and reflection.

20. The system of claim 17, wherein the banded slider is integrated into a mixing board.

21. The system of claim 17, wherein a third section included in the plurality of sections is not adjacent to the first section, and the first set of one or more visual attributes characterizes an interior of the third section.

* * * * *